United States Patent [19]

Takano et al.

[11] Patent Number: 5,080,537
[45] Date of Patent: Jan. 14, 1992

[54] APPARATUS FOR MACHINING BEVEL GEAR

[75] Inventors: Kohzoh Takano; Yoshiharu Watabe; Satoshi Takahashi; Satoru Ichihashi, all of Sayama, Japan

[73] Assignee: Honda Giken Kogyo Kabushiki Kaisha, Tokyo, Japan

[21] Appl. No.: 641,398

[22] Filed: Jan. 15, 1991

[30] Foreign Application Priority Data

Jan. 20, 1990 [JP] Japan .................................. 1-11220
Jan. 20, 1990 [JP] Japan .................................. 1-11222

[51] Int. Cl.⁵ ................................................ B23F 9/00
[52] U.S. Cl. ........................................ 409/29; 51/134; 51/287; 409/38; 409/50
[58] Field of Search .............. 409/25, 27, 29, 38, 409/50; 51/108 R, 134, 237 T, 287

[56] References Cited

U.S. PATENT DOCUMENTS 3,212,403 10/1965 Deakin ................................ 409/27

FOREIGN PATENT DOCUMENTS 40-516    1/1965  Japan .
58-35387  8/1983  Japan .
177012   10/1961  Sweden .................. 409/25
0884745  12/1961  United Kingdom .
1074985   7/1967  United Kingdom ........ 409/25
1346264   2/1974  United Kingdom .
1438454   6/1976  United Kingdom .

Primary Examiner—Daniel W. Howell
Attorney, Agent, or Firm—Armstrong, Nikaido, Marmelstein, Kubovcik & Murray

[57] ABSTRACT

An apparatus for machining a bevel gear has an apparatus frame, a spindle head provided on the apparatus frame for rotatably supporting a spindle on which a machining tool is mounted, and an indexing unit provided for holding a workpiece such that the workpiece is indexed by one pitch of teeth to be formed thereon to perform machining of tooth spaces with the machining tool. The spindle is horizontally and rotatably held on a spindle head such that the spindle is immovable in the axial direction of the spindle. The spindle head is movable back and forth in the axial direction and is movable in a lateral direction at right angles to the axial line. A column is provided on the apparatus frame in front of the spindle head such that the column is turnable about a vertical axial line at an arbitrary angle. The indexing unit is provided in a plurality of pieces on an external periphery of the column at a distance between each of the indexing units. The indexing units are provided on the column in a vertically movable manner. A plurality of vertically movable lifting frames are provided on the column at a distance therebetween in the circumferential direction of the column and the indexing units are detachably mounted on the column.

3 Claims, 7 Drawing Sheets

1

APPARATUS FOR MACHINING BEVEL GEAR

BACKGROUND OF THE INVENTION

This invention relates to an apparatus for machining a bevel gear such as a spiral bevel gear, a hypoid gear or the like.

A conventional apparatus for machining a bevel gear of this kind is disclosed in Japanese Published Examined Patent Application No. 516/1965. The apparatus comprises an apparatus frame, a spindle head provided on the apparatus frame for rotatably supporting a spindle on which a machining tool is mounted, and an indexing unit for supporting a workpiece as a raw material for a bevel gear, thereby machining each tooth space with the machining tool by rotating the workpiece with the indexing unit by one pitch of teeth to be formed on the workpiece. In this apparatus, the spindle is rotatably supported by the spindle head in a posture downwardly inclined towards the indexing unit such that the spindle is movable in an axial line of the spindle. The spindle head is movable in a lateral direction which crosses the axial line of the spindle at right angles, and is rotatable about a perpendicular axial line which crosses at right angles the axial line of the spindle. A movable frame is provided on the apparatus frame in front of the spindle head such that the movable frame is movable in the horizontal forward and backward directions as well as in the lateral direction. The indexing unit is supported on the movable frame such that it is movable up and down along an inclined surface which crosses the axial line of the spindle at right angles. In order to feed the machining tool, the spindle is moved forwards and backwards relative to the spindle head. In order to mount or dismount the workpiece, the movable frame is moved forwards and backwards. In order to change the spiral direction of teeth, the indexing unit is moved by the movement of the movable frame from one side of the lateral direction to the other side and, at the same time, the spindle head is rotated, thereby moving the the cutting point from one lateral side to the other side of the workpiece. In order to change the pitch angle of the bevel gear, the spindle head is rotated and, at the same time, is moved in the lateral direction, thereby changing the angle of inclination of the spindle against the indexing unit.

The conventional apparatus as described above has the following disadvantages. Namely, in changing the spiral direction, the spindle head must be rotated and the movable frame must be moved in the lateral direction, resulting in a complicated work. In addition, the spindle is supported slidably in the axial direction relative to the spindle head and is supported in a laterally movable manner and a rotatable manner via the spindle head on the apparatus frame. Therefore, the spindle has a degree of freedom of as many as three and is liable to give rise to vibrations of the spindle due to looseness or the like in each of the sliding portions and rotatable portion. The lifetime and the machining accuracy of the machining tool are thus likely to be lowered.

In the above-mentioned conventional apparatus, the indexing pitch of the indexing unit is fixed. Therefore, bevel gears of different tooth pitches cannot be machined. As a conventional apparatus in which the indexing pitch can be varied, Japanese Published Examined Utility Model Application No. 58-35387/1983 discloses an apparatus having the following construction. The apparatus has two pieces of indexing plates provided on an indexing shaft on which a workpiece is mounted. Two pieces of Geneva shafts (or geneva movement shafts) are provided, each of the shafts having a Geneva pin which is engageable with slots on an external periphery of each of the indexing plates. Each of the Geneva shafts is connected via a change-over clutch to a driving source. By changing over the change-over clutch, the indexing shaft is rotated at an indexing pitch between that corresponding to one of the indexing plates and that corresponding to the other of the indexing plates. It may be considered to incorporate this indexing apparatus into the above-described apparatus for machining a bevel gear in order to cope with a change in the pitch. However, in this indexing apparatus, it is not possible to change the indexing plates and the Geneva shafts to prepare for the next machining work during the machining of the bevel gear. The indexing apparatus is therefore not suitable for manufacturing various kinds of products respectively in small quantities.

OBJECTS AND SUMMARY OF THE INVENTION

Taking the above problems into account, this invention has a first object of providing an apparatus for machining a bevel gear in which the changes not only in the pitch but also in the pitch angle can be easily dealt with, and in which the decrease in the machining tool lifetime and the deterioration in the machining accuracy due to the vibration of the spindle can be prevented by decreasing the degree of freedom of the spindle. A second object of this invention is to provide an apparatus for machining a bevel gear in which the change in spiral direction can be easily dealt with.

In order to attain the above-described first object, there is provided an apparatus for machining a bevel gear comprising an apparatus frame, a spindle head provided on the apparatus frame for rotatably supporting a spindle on which a machining tool is mounted, an indexing unit provided on the apparatus frame for holding a workpiece such that the workpiece is indexed by one pitch of teeth to be formed thereon, thereby machining each tooth space with the machining tool. The spindle is horizontally and rotatably supported on the spindle head such that the spindle is immovable in an axial direction of the spindle. The spindle head is movable back and forth in the axial direction and is movable in a lateral direction at right angles to the axial line. A column is provided on the apparatus frame in front of the spindle head such that the column is turnable about a vertical axial line at an arbitrary angle. The indexing unit is provided in a plurality of pieces on an external periphery of the column at a distance between each of the indexing units.

According to another feature of this invention, in order to attain the above-described second object, the indexing units are provided on the column in a vertically movable manner.

In machining bevel gears of different pitches, the column is turned such that an indexing unit having an indexing pitch corresponding to the pitch of the bevel gear is selected for positioning it in a position which opposes the machining tool. In this case, if the diameter of the workpiece changes, the cutting point relative to the workpiece is misaligned in the lateral direction, resulting in a change in the spiral angle. Therefore, the position of the spindle head is laterally adjusted depending on the diameter of the workpiece.

In addition, since the inclination angle of each of the indexing units relative to the spindle can be adjusted by the rotation of the column, it can cope with a change in the pitch angle. In this case, the position of the spindle head is also laterally adjusted to correct the misalignment of the cutting point relative to the workpiece.

When each of the indexing units is moved from a lower position to an upper position, the cutting point moves from a lower side-portion to an upper side-portion of the machining tool, resulting in a change in the spiral direction of the teeth. Therefore, by simply moving up and down each of the indexing units, the apparatus can cope with the change in the spiral direction of the teeth.

When the workpiece is mounted on, or dismounted from, each of the indexing units, the spindle is moved backwards. After the workpiece has been mounted, the spindle head is moved forwards to a predetermined cutting position at every rotation by one pitch of the workpiece, thus machining each tooth space.

In the apparatus of this invention, the spindle is supported on the apparatus frame via the spindle head such that the spindle is movable back and forth (i.e., in the axial direction of the spindle) as well as in the lateral direction. The degree of freedom of the spindle is therefore two. As compared with the above-described conventional apparatus, the degree of freedom of the apparatus of this invention is smaller by one and, consequently, the vibrations of the spindle are less likely to occur, resulting in an improved durability of the machining tool. Even though the degree of freedom of the spindle is decreased, if the degree of freedom of the indexing unit is increased, the rigidity of supporting the workpiece is lowered, and the improvement in the machining accuracy cannot be obtained. However, in this invention, the degree of freedom of the indexing unit is as small as two because the indexing unit is supported on the apparatus frame only for turning and vertically sliding movements relative to the apparatus frame. The machining accuracy can, therefore, be improved.

Furthermore, when an indexing unit currently in use is facing the machining tool, the other indexing unit (or units) which has been finished with the machining work is positioned in that peripheral position of the column which does not face the machining tool. Therefore, the finished indexing unit (or units) can be dismounted from the column so that another indexing unit (or units) can be mounted on the column instead. In vertically moving the indexing units, if a plurality of vertically movable lifting frames are provided on the column at a distance therebetween in the circumferential direction of the column and if each of the indexing units is detachably mounted on each of the lifting frames, it is advantageous in that the indexing units can be changed without taking the lifting mechanism into pieces.

BRIEF DESCRIPTION OF THE DRAWINGS

The above and other objects and the attendant advantages of this invention will become readily apparent by reference to the following detailed description when considered in conjunction with the accompanying drawings wherein.

DETAILED DESCRIPTION OF THE PREFERRED EMBODIMENT

Figure 1:
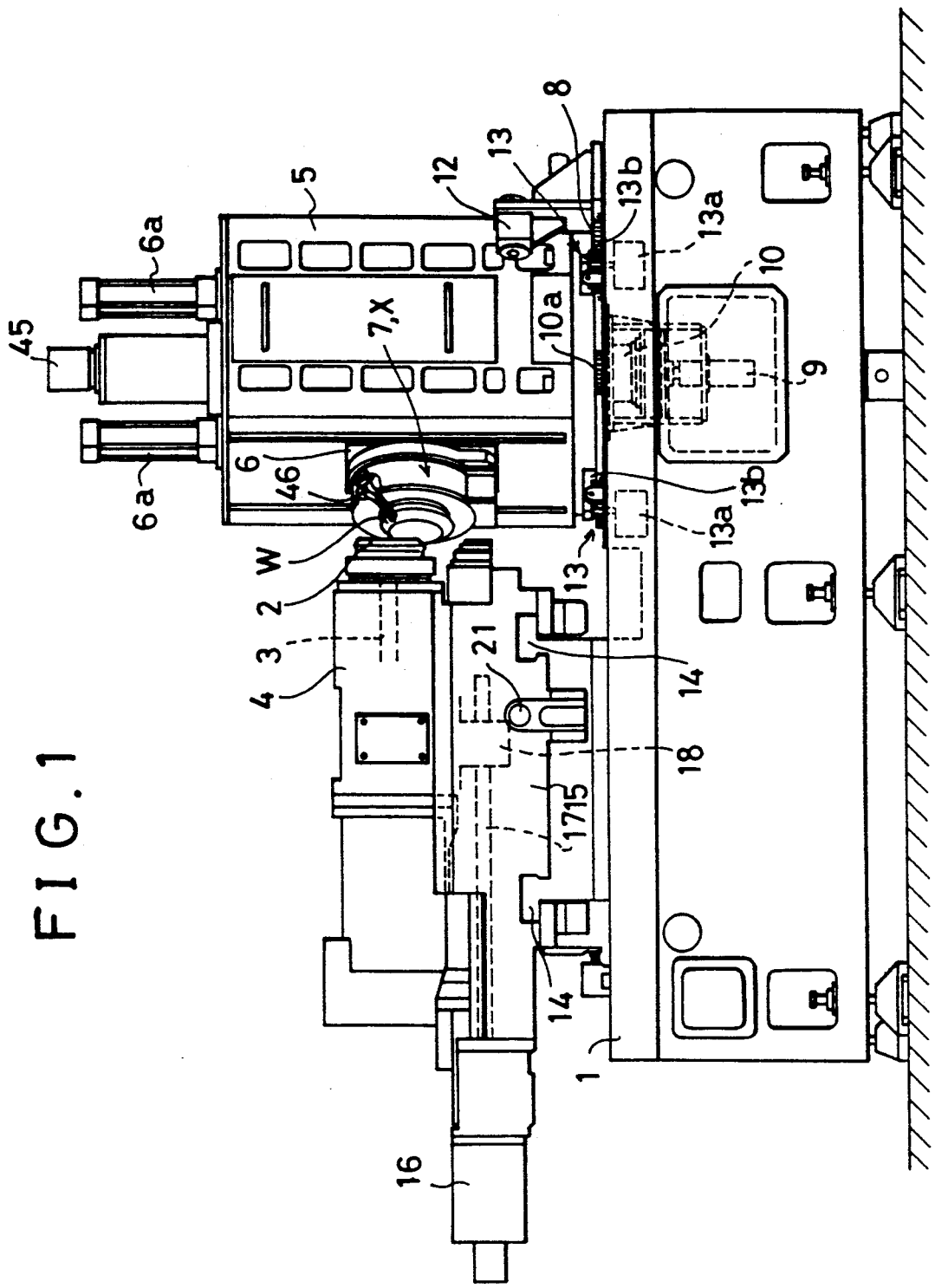
FIG. 1 is a side view of an example of an apparatus according to the invention.
Figure 2:
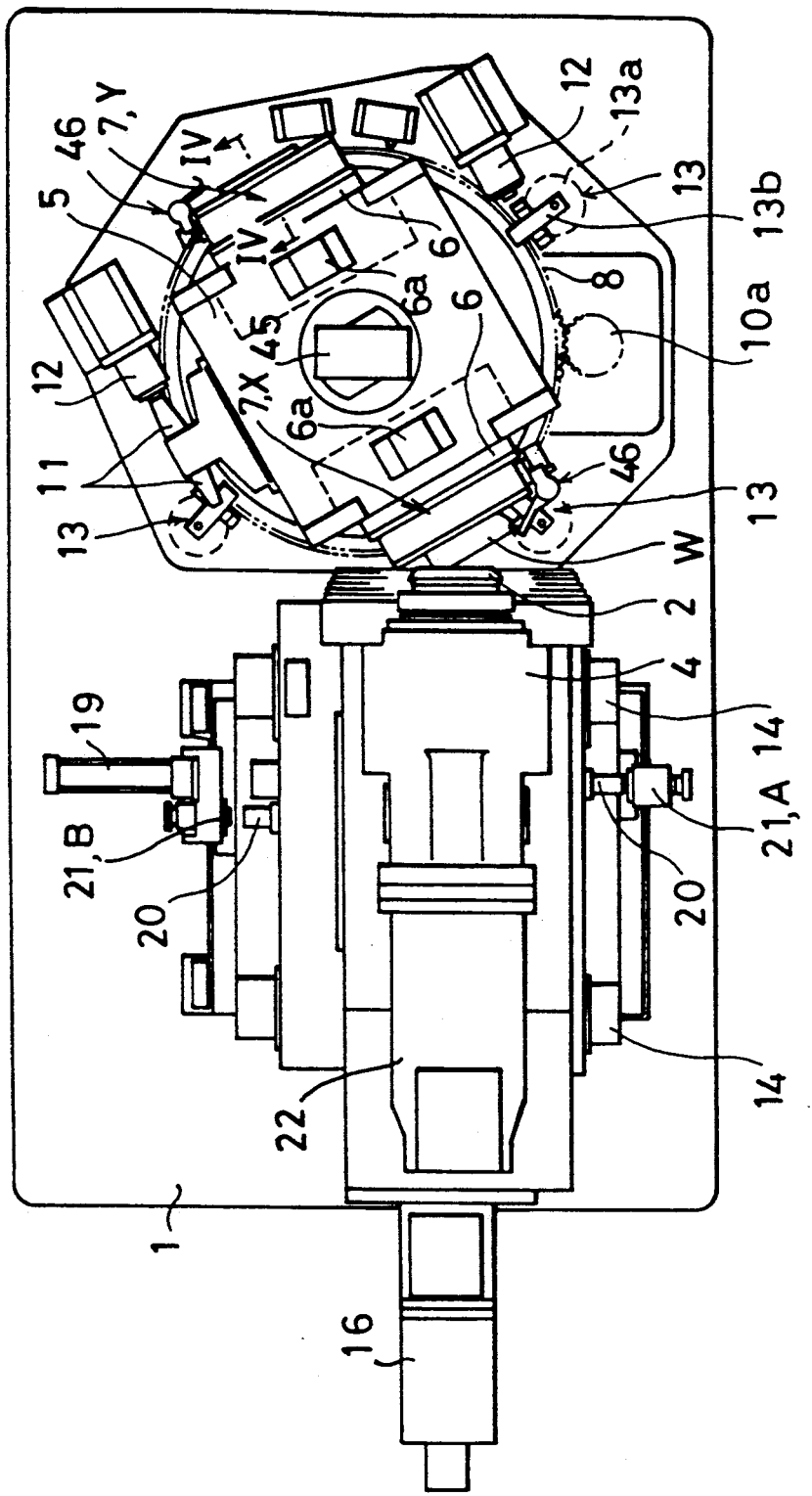
FIG. 2 is a plan view thereof.

The drawings show an embodiment of this invention as applied to a gear grinding machine as an apparatus for machining a bevel gear. With reference to FIGS. 1 and 2, a spindle head 4 and a column 5 are provided on an apparatus frame 1 in a side by side relationship. The spindle head 4 horizontally and rotatably supports a spindle 3 on which a cup-shaped grinder 2 as a machining tool is mounted such that the spindle 3 is immovable in an axial direction of the spindle 3. The column 5 is turnable about a vertical axial line. Lifting plates 6, 6 which are respectively lifted and lowered by cylinders 6a, 6a are provided on diametrically opposite peripheral sides of the column 5. An indexing unit 7 is mounted on each of the lifting plates 6 for holding a workpiece W as a raw material for a bevel gear. Depending on the kind of workpiece, one of the indexing units 7, 7 is selected, by the rotation of the column 5, such that the indexing unit 7 is positioned in a machining position which faces the spindle head 4. The workpiece W is indexed by one pitch of teeth which are to be generated thereon and tooth spaces are grinded with the grinder 2.

A ring gear 8 is fixedly provided at a bottom portion of the column 5. A pinion 10a provided on an output shaft of a reducer 10 which is connected to an electric motor 9 for rotation of the column 5, is engaged with the ring gear 8 such that, by the operation of the electric motor 9, the column 5 may be rotated in the normal and the reverse directions. Two pieces of pads 11 are provided in a projecting manner on one lower side of the periphery of the column 5. A stopper 12 is provided on an upper surface of the apparatus frame 1 respectively in such a position as to face the locus of rotation of each of the pads 11. A plurality of braking means 13 each comprising a cylinder 13a and a brake member 13b which can be pressed against an upper surface of the ring gear 8 through the operation of the cylinder 13a, are provided on an upper surface of the apparatus frame 1. The column 5 can thus be positioned by the operation of the braking means 13 in a position stopped by each of the stoppers 12.

Figure 3:
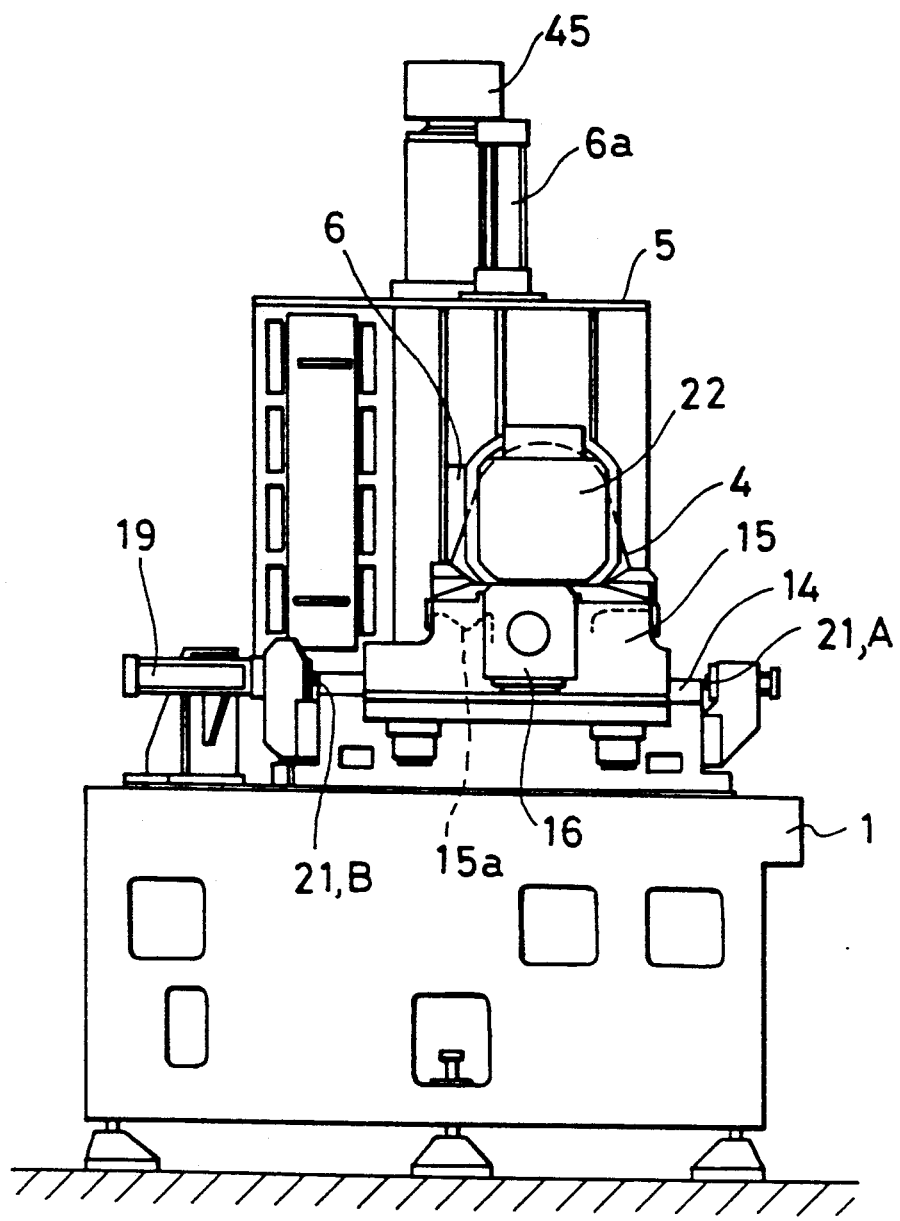
FIG. 3 is a left side view of the apparatus shown in FIG. 1.

The spindle head 4 is supported on the apparatus frame 1 such that it is movable back and forth in the axial direction of the spindle 3, i.e., in the longitudinal direction, and that it is movable in a lateral direction. More detailed description is now made with reference to FIGS. 1 through 3. A sliding base 15 which is supported on rails 14 extending in the lateral direction is provided on the apparatus frame 1. The spindle head 4 is mounted on the sliding base 15 such that it is movable in the longitudinal direction along a guide groove 15a which is formed in the sliding base 15. The sliding base 15 is provided with a longitudinally extending threaded bar 17 which is rotated by an electric motor 16 at a rear end of the sliding base 15 and the threaded bar 17 is threadingly inserted into a nut sleeve 18 which is fixed to a bottom surface of the spindle head 4. A piston rod of a cylinder 19 which is fixedly provided on an upper surface of the apparatus frame 1 is connected to the sliding base 15. A pad 20 is provided in a projecting manner on each of the right and left sides of the sliding base 15. A stopper 21 is provided on each of the right and left sides of an upper surface of the apparatus frame 1. The spindle head 4 is thus arranged to be provided with a longitudinal movement by the rotation of the electric motor 16 in the normal and reverse directions via the threaded bar 17 as well as a lateral movement by the operation of the cylinder 19 via the sliding base 15. An electric motor 22 for driving the spindle 3 is provided on the rear end of the spindle head 4.

Figure 4:
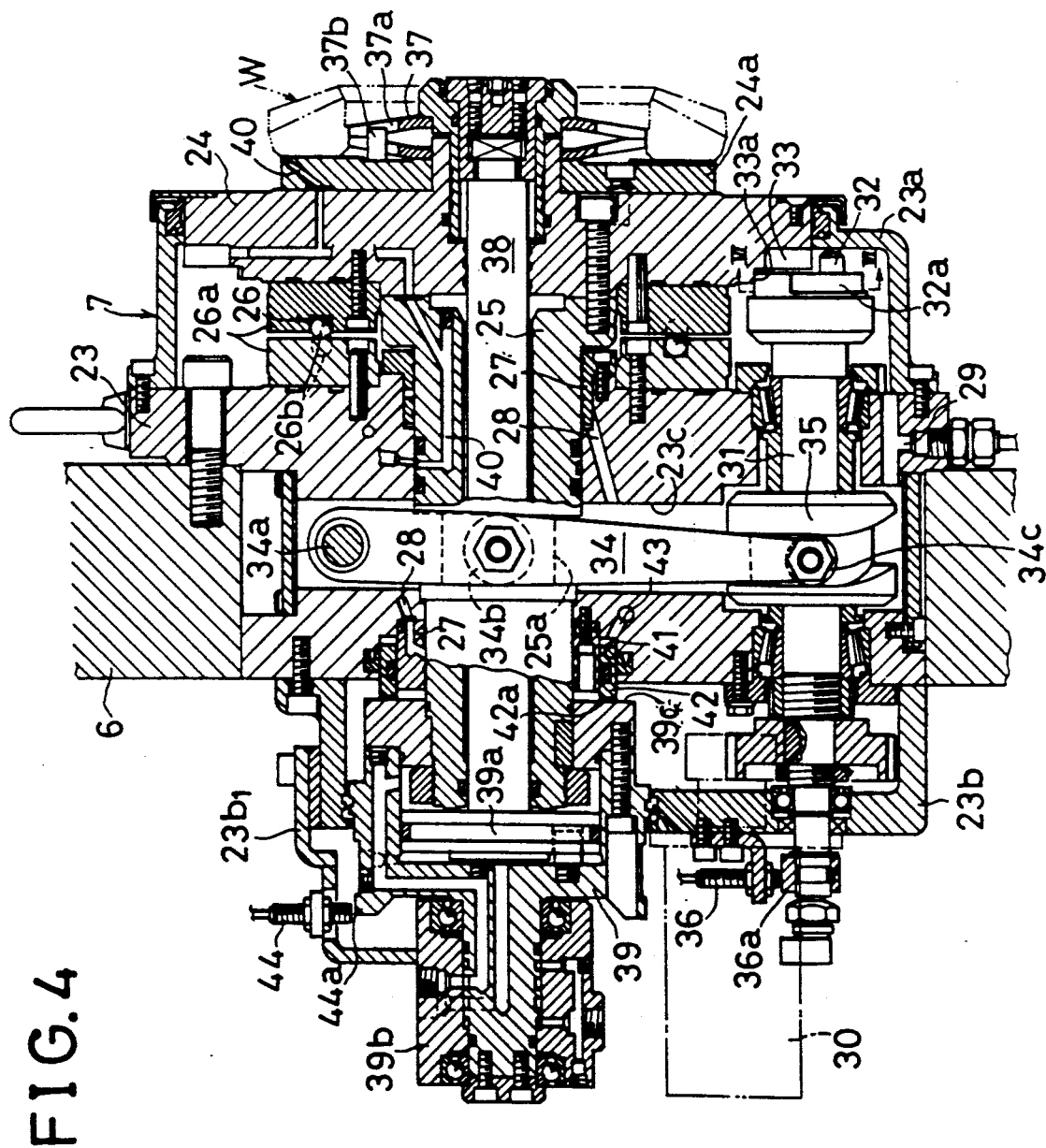
FIG. 4 is an enlarged sectional side view of an indexing unit taken along the line IV—IV of FIG. 2.
Figure 5:
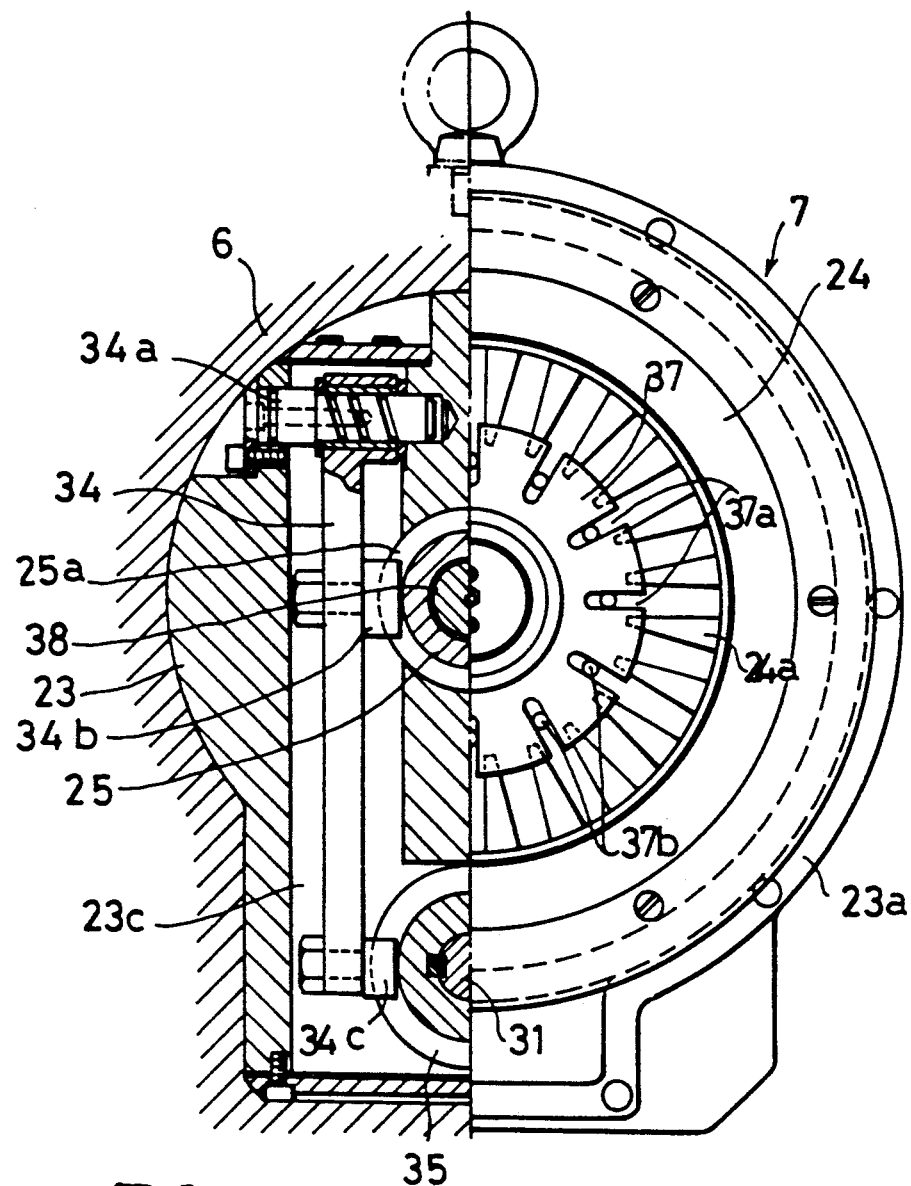
FIG. 5 is a front view, half shown in section, of the indexing unit.

Each of the indexing units 7 comprises, as shown in FIGS. 4 and 5, a base member 23 which is bolted to the lifting plate 6 and an indexing table 24 which is on the front side of the base member 23. The indexing table 24 is supported on the base member 23 by a rotatable shaft 25 which is bolted to the rear thereof by inserting the rotatable shaft 25 into the base member 23, such that the indexing table 24 is rotatable and is slidable in the axial direction, i.e., in the forward and backward directions. Circular seating plates 26a are bolted in such places as to face the base member 23 and the indexing table 24 respectively. In each of the seating plates 26a steel balls 26b are provided in a ring form which is concentric with the rotatable shaft 25. By engaging each of the steel balls 26b on one of the seating plates 26a with each pitch between each of the steel balls 26b on the other seating plate 26a, the indexing table 24 can be retained in each of the indexing positions, thus constituting an indexing mechanism 26.

Bearing sleeves 27 are fittingly provided on both ends of the shaft bore through which the rotatable shaft 25 is inserted. Lubricating oil is supplied to the internal peripheries of the bearing sleeves 27 via lubricating holes 28 to perform lubrication between the rotatable shaft 25 and the bearing sleeves 27. A front cover 23a for sealing the space between the base member 23 and the indexing table 24 in front of the base member 23, and a rear cover 23b for sealing the rear space of the base member 23 are attached to the base member 23. The lubricating oil is discharged from a drain hole 29.

Figure 6:
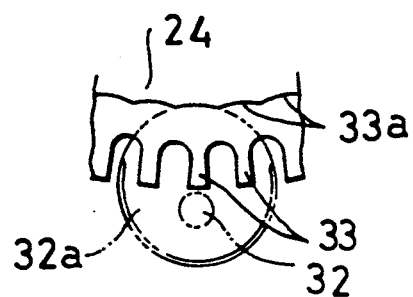
FIG. 6 is a rear view of a Geneva gear portion as seen from the line VI—VI of FIG. 4.

At a lower portion of the base member 23, a driving shaft 31 which is driven by a hydraulic motor 30 attached to the rear cover 23b, is rotatably supported. The driving shaft 31 is provided at its front end with a disc 32a and an eccentric Geneva pin 32 attached to the disc 32a. On the rear external periphery of the indexing table 24, there is formed, as shown in FIG. 6, a Geneva gear 33 with which the Geneva pin 32 is engaged, and that circular groove 33a on the internal side of the Geneva gear 3 with which part of the external periphery of the disc 32a is engaged. A vertically extending opening 33c is provided in a longitudinally intermediate portion of the base member 23 for enclosing therein a shift arm 34 which is swingably supported by a shaft 34a at an upper end thereof. The shift arm 34 is provided with an intermediate pin 34b which engages with an intermediate external groove 25a of the rotatable shaft 25, and a pin 34c which engages with a shift cam 35 formed at an intermediate portion of the driving shaft 31.

In this arrangement, when the driving shaft 31 is rotated, the indexing table 24 is moved forwards (to the right in FIG. 4) in the initial 90-degree rotation of the driving shaft 31 via the shift cam 35 and the shift arm 34. The engagement of the indexing mechanism 26 is thereby released and the engagement between the disc 32a and the circular groove 33a is also released. In the following 180-degree rotation of the driving shaft 31, the Geneva pin 32 is engaged with the Geneva gear 33 such that the indexing table 24 is rotated by one pitch of the Geneva gear 33. Slightly before the Geneva pin 32 is pulled out of the Geneva gear 33, the indexing table 24 begins to be moved backwards via the shift cam 35 and the shift arm 34 such that the disc 32a engages with the circular groove 33a, and then the indexing mechanism 26 is engaged, thereby fixing the position of the indexing table 24. When the driving shaft 31 has been rotated one rotation, a proximity switch 36 which cooperates with a dog 26a at a rear end of the driving shaft 31 gives a signal to stop the rotation of the driving shaft 31.

At a front of the indexing table 24, there are provided a receiving seat 24a for the workpiece W, and that clamping member 37 of a cone disc spring shape which is provided with radially extending notches 37a and which is radially expanded to clamp the workpiece W from inside thereof. An operating rod 38 is inserted through the rotatable shaft 25 such that the operating rod 38 expands the clamping member 37 by pressing it from the front direction thereof. At that rear end portion of the rotatable shaft 25 which extends towards the rear of the base member 23, there is fixedly provided a clamping cylinder 39 into which a piston 39a to be connected to the operating rod 38 is inserted. The clamping member 37 is operated to clamp the workpiece W via the operating rod 38 by introducing a pressurized fluid into a front chamber of the cylinder 39 via that rotary joint 39b at a rear portion of the cylinder 39 which is supported by a stay 23b₁ on the rear cover 23b. On the receiving seat 24a, there are provided supporting pins 37b for the clamping member 37 and an air passage 40 for an air switch which detects the seating of the workpiece W.

A circular groove 41 which opposes an end wall 39c on the front side of the clamping cylinder 39 is formed on a rear surface of the base member 23 for internally inserting therein a circular piston 42 which abuts the end wall 39c. A pressurized fluid is introduced into the circular groove 41 via a fluid passage 43 such that the rotatable shaft 25, i.e., the indexing table 24, is pushed backwards via the piston 42. During the indexing operation by the driving shaft 31, the fluid pressure to be introduced into the circular groove 41 is kept low and, when the backward movement of the indexing table 24 has been confirmed by that proximity switch 44 on the stay 23b₁ which cooperates with the dog 44a at the rear external periphery of the clamping cylinder 39, the fluid pressure to be introduced into the circular groove 41 is increased. The pressing force of the indexing table 24 against the base member 23 is thus increased such that the indexing table 24 can be firmly positioned and held by the indexing mechanism 26. According to this arrangement, the tilting of the indexing table 24 due to an eccentric load to be acted on the indexing table 24 during the machining of the workpiece W is effectively prevented by the circular piston 42 on that rear surface side of the base member 23 which has a large supporting span against the indexing table 24.

The steel balls 26b as constituting elements of the indexing mechanism 26 are arranged in rows of ring shape which is substantially the same in diameter as the outer diameter of the workpiece W. The point of action of grinding load by the grinder 2, i.e., the teeth portion of the workpiece W, is located on the circle on which the steel balls 26b are arranged. The grinding load can therefore be received by the steel balls 26b which are located at the shortest distance from the point of action of the grinding load. It is thus possible to increase the supporting rigidity of the indexing table 24 against the grinding load.

The reason for introducing the fluid pressure into the circular groove 41 also during the indexing operation is to remove the looseness (or play) of the indexing table 24 during its forward and backward movement as well as to shorten the time required for increasing the fluid pressure after the indexing operation. However, if it is only for the purpose of removing the looseness, the circular piston 42 may be urged backwards by a spring to be disposed inside the circular groove 41.

In this embodiment, the circular piston 42 is externally fitted into the bearing sleeve 27 which constitutes an internal peripheral wall of the circular groove 41. Grooves 42a are formed in a plurality of peripheral portions of the rear surface of the piston 42 which abuts the end wall 39c. In this arrangement, the lubricating oil to be leaked from the bearing sleeve 27 is arranged to be drained through the grooves 42a, and the sliding resistance between the bearing sleeve 27 and the end wall 39c is made to be decreased.

The indexing mechanism 26 needs not be limited to a ball type of this embodiment, but may be of a toothed type.

The hydraulic motor 30 of the indexing unit 7, the cylinder 39, and the like are supplied with pressurized oil through a rotary joint 45 which is vertically provided on an upper end of the column 5.

Figure 7:
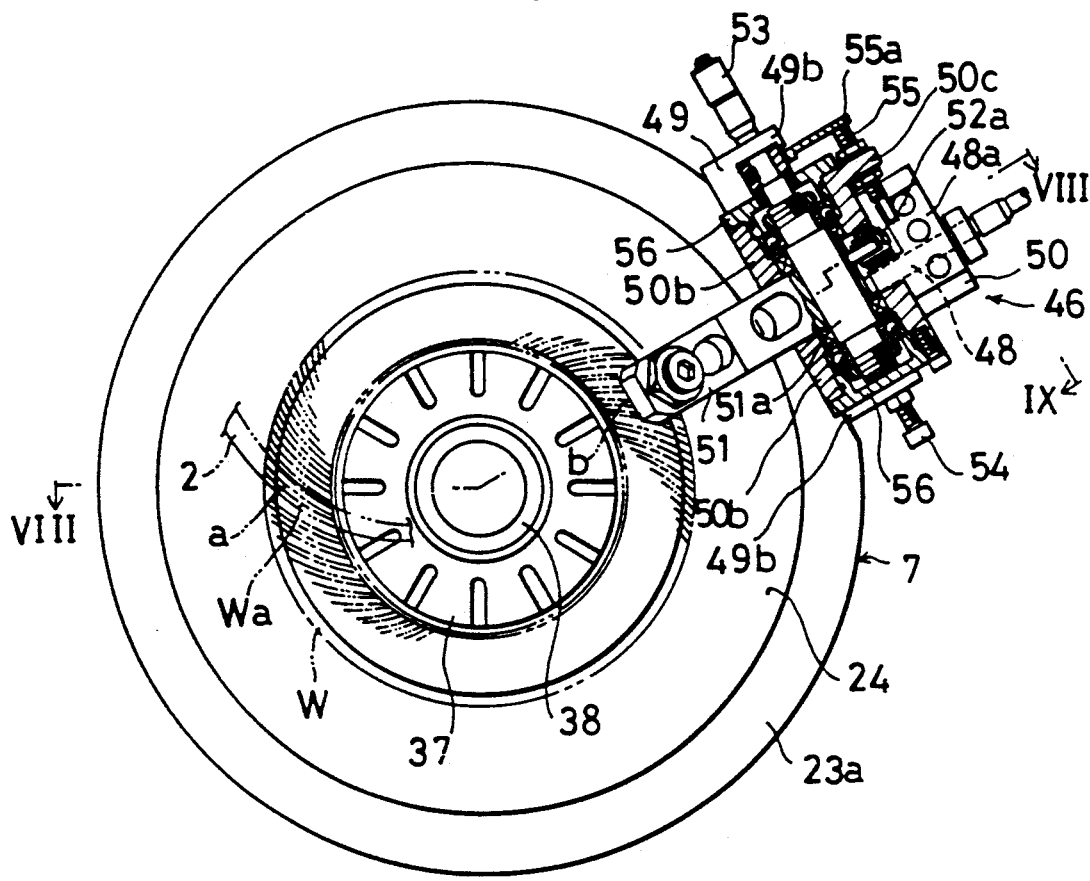
FIG. 7 is a front view of the indexing unit including a tooth thickness measuring unit.
Figure 9:
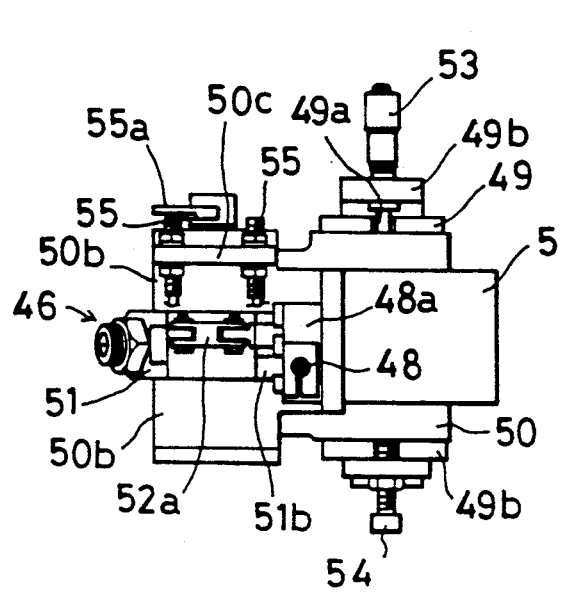
FIG. 9 is a side view of the tooth thickness measuring unit as seen from the line IX—IX of FIG. 7.
Figure 8:
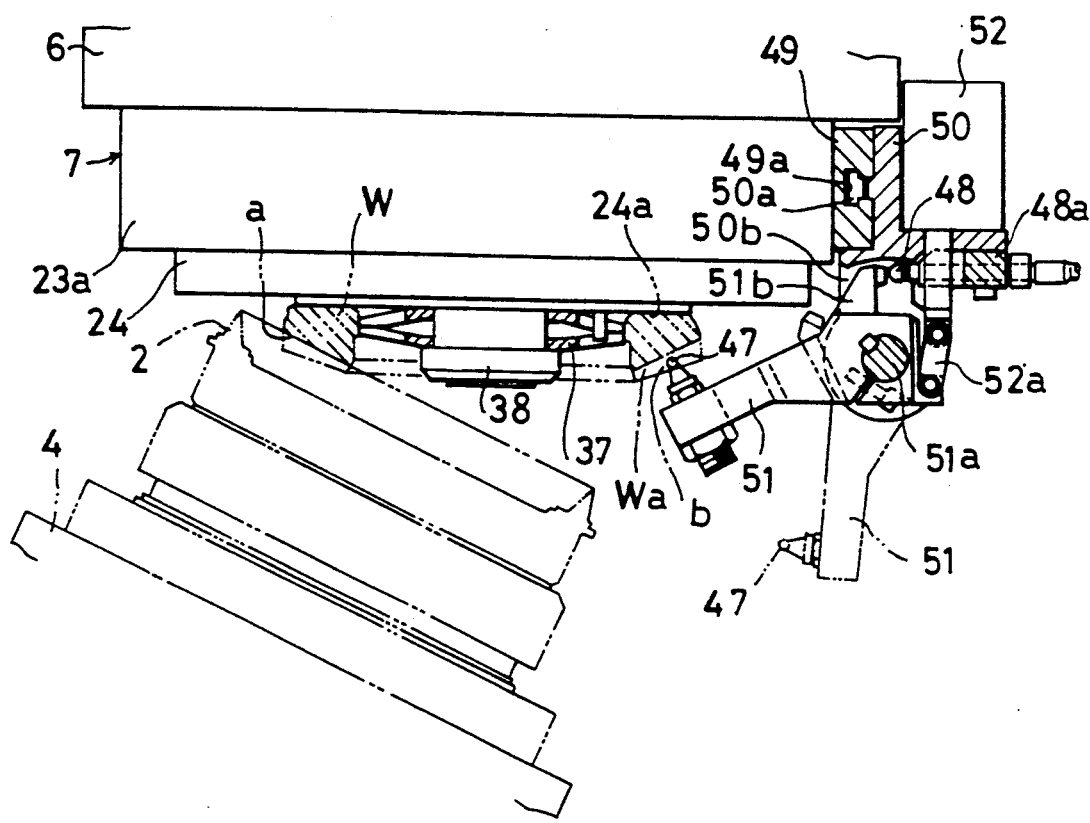
FIG. 8 is a sectional view taken along the line VIII—VIII of FIG. 7.

Each of the indexing units 7 is provided with a tooth thickness measuring unit 46 comprising a contact element 47 which is insertable into the tooth space of the workpiece W, and a detector 48 for detecting the inserting depth of the contact element 47. The tooth thickness measuring unit 46 is explained in more detail with reference to FIGS. 7 through 9. A guide block 49 is fixedly provided in the periphery of the front cover 23a of the base member 23. A base frame 50 is provided such that it is supported in a manner to be slidable in a tangential direction of the indexing table 24 by engaging, via a sliding element 50a, with a guide groove 49a formed in the guide block 49. A swing arm 51 having at its front end the above-described contact element 47 is rotatably supported between a pair of leg pieces 50b, 50b by a shaft 51a which is at a base end of the swing arm 51. The swing arm 51 is arranged to be swingable by a cylinder 52 which is attached to the base frame 50 via a link 52a, between an operating position on the side of the workpiece W and a non-operating position which lies away from the workpiece W. A detector 48 comprising an electric micrometer which opposes a projection 51b which extends from the base end of the swing arm 51, is mounted on the base frame 50 via a holder 48a such that the inserting depth of the contact element 47 into the tooth space can be detected.

The guide block 49 is provided with leg pieces 49b, 49b which are located on both sides of the sliding direction of the base frame 50. The leg piece 49b on one side is provided with a slide adjustment member 53 and the leg piece 49b on the other side is provided with a stopper bolt 54. The position of the base frame 50 is thus arranged to be adjustable such that the phase difference in the circumferential direction between the grinding position a of the grinder 2 and the inserting position b of the contact element 47 becomes integral multiples of the tooth pitch of the workpiece W.

A pair of proximity switches 55, 55 are provided on a stay 50c which extends from one of the leg pieces 50b on the base frame 50, for detecting the operating position and the non-operating position of the swing arm 51 in cooperation with a detecting piece 55a which is attached to the shaft 51a. Protecting caps 56 are provided for protecting the bearing portions of the shaft 51a.

In grinding the workpiece W, the workpiece W is first roughly set to the receiving seat 24a of the indexing table 24 with the clamping member 37 operated as a centering guide. Then, the swinging arm 51 of the tooth thickness measuring unit 46 is swung into the operating position so that the contact element 47 is inserted into a tooth space Wa in the neighborhood of the inserting position b. According to this operation, the position of the workpiece W is fixed in phase on the basis of the contact element 47, and the tooth space Wa in the neighborhood of the grinding position a is accurately indexed relative to the grinding position a.

Then, the operating rod 38 is pulled inwards as previously explained in order to expand by compressing the clamping member 37, thereby fixing the workpiece W to the indexing table 24.

Thereafter, while the swing arm 51 is swung into the non-operating position, the spindle head 4 is moved forwards. The grinder 2 is fed, while rotating, into the tooth space Wa which is positioned in the grinding position a to perform the grinding operation. After the grinding operation has been finished, the spindle head 4 is once moved backwards to index the indexing table 24 by one pitch. By indexing the next tooth space into the grinding position a, the spindle head 4 is again moved forwards. The above-described operation is repeated to form in succession each of the tooth spaces in the workpiece W.

When one of the ground tooth spaces Wa has reached the inserting position b, the swing arm 51 is swung into the operating position to insert the contact element 47 into the tooth space Wa. The tooth thickness is thus measured by that inserting depth of the contact element 47 which is detected by the detector 48. On the basis of this measurement, corrections are made with respect to the depth of cut of the grinder 2 to prepare for grinding of the next workpiece or, if necessary, the workpiece under grinding process is ground once again. It is preferable to insert the contact element 47 into a plurality of tooth spaces so that an average value of the tooth thickness may be obtained. It is also preferable that this measurement can be obtained during the grinding work. Therefore, in this embodiment, the tooth thickness measuring unit 46 is arranged in substantially a symmetrical position of the grinding position a so that the swing arm 51 does not interfere with the grinder 2.

Figure 10:
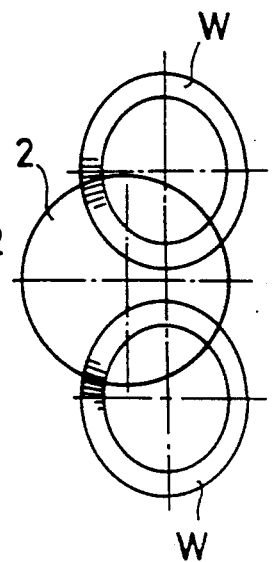
FIG. 10 is a diagram showing a change in the spiral direction of the teeth.

FIGS. 1 and 2 show a condition in which the column 5 is turned clockwise to a rotating position at which the column 5 is stopped by the stopper 12. The indexing unit 7 marked by X is thus selected to be positioned in the position of grinding the workpiece W to be held by the indexing unit 7. The spindle head 4 is moved to the right-side position which is determined by the stopper 21 marked by A. When the indexing unit 7 is lifted from a lower position to an upper position by the lifting frame 6, the cutting point is moved from a lower side-portion to an upper side-portion of the grinder 2. As a result, the spiral direction of the teeth is changed as shown in FIG. 10. The change in the spiral direction can thus be dealt with by the lifting and lowering of the indexing unit 7.

The indexing unit 7 marked by X has an indexing pitch which is different from that of the indexing unit 7 marked by Y on the opposite side. When workpieces of different pitches are ground, the column 5 is turned counterclockwise such that the indexing unit 7 marked by Y is selected in the grinding position. When the diameter of the workpiece is large, the cutting point of the grinder 2 is off towards the left in FIG. 7, resulting in a larger spiral angle of the teeth. In such a case, the spindle head 4 is moved to the left position which is determined by the stopper 21 marked by B to correct the misalignment of the cutting point. By changing the lengths of the pads 20 of the sliding base 15 or the mounting positions of the stoppers 21, it is possible to cope with workpieces of varying diameters.

In addition, by changing the lengths of the pads 11 or the mounting positions of the stoppers 12 of the column 5, it is possible to change the inclination angle of the indexing unit 7 relative to the spindle 3. Therefore, it is possible to cope with a change in the pitch angle. In making this change, the position of the spindle head 4 is adjusted by moving it laterally to correct the lateral misalignment of the cutting point relative to the workpiece W. The change in the indexing unit 7 can be performed in the following way. Namely, when the indexing unit 7 which is located opposite to the grinding position has already been finished, it is dismounted from the lifting frame 6 to change it for another indexing unit corresponding to the next kind of workpiece, while the indexing unit 7 which has been selected in the grinding position is performing the grinding work.

In the above-described embodiment, two pieces of indexing units 7 are provided. It is, however, needless to say that more than three pieces of indexing units can also be provided.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for machining a bevel gear comprising:
   an apparatus frame;
   a spindle head provided on said apparatus frame for rotatably supporting a spindle on which a machining tool is mounted;
   a plurality of indexing units provided on said apparatus frame for holding workpieces such that each of said workpieces is indexed by one pitch of teeth to be formed thereon, thereby enabling machining each tooth space with said machining tool;
   wherein said spindle is horizontally and rotatably supported on said spindle head such that said spindle is immovable in an axial direction of said spindle;
   said spindle head is movable back and forth in said axial direction and is movable in a lateral direction at right angles to said axial line;
   a column is provided on said apparatus frame in front of said spindle head such that said column is turnable about a vertical axial line at an arbitrary angle; and
   said indexing units are provided on an external periphery of said column and said indexing units are separated from each other.

2. An apparatus for machining a bevel gear as claimed in claim 1, wherein each of said plurality of indexing units are vertically movably provided on said column.

3. An apparatus for machining a bevel gear as claimed n claim 2, wherein a plurality of vertically movable lifting frames are provided on said column at a distance therebetween in the circumferential direction of said column and wherein each of said plurality of indexing units is detachably mounted on respective ones of said lifting frames.

* * * * *

UNITED STATES PATENT AND TRADEMARK OFFICE
CERTIFICATE OF CORRECTION

PATENT NO. : 5,080,537
DATED : January 14, 1992
INVENTOR(S) : Kohzoh TAKANO et al It is certified that error appears in the above-identified patent and that said Letters Patent is hereby corrected as shown below:

On the cover page, Item [30], line 1, "1-11220" should read -- 2-11220 --;
line 2, "1-11222" should read -- 2-11222 --.
Column 10, line 39, "n" should read -- in --.

Signed and Sealed this

Fifteenth Day of June, 1993

Attest:

MICHAEL K. KIRK

Attesting Officer

Acting Commissioner of Patents and Trademarks